C. S. TUFENKJIAN.
AUTOMATIC SAW TOOTH SETTING MACHINE.
APPLICATION FILED JUNE 26, 1908.
926,785.
Patented July 6, 1909.
4 SHEETS—SHEET 1.
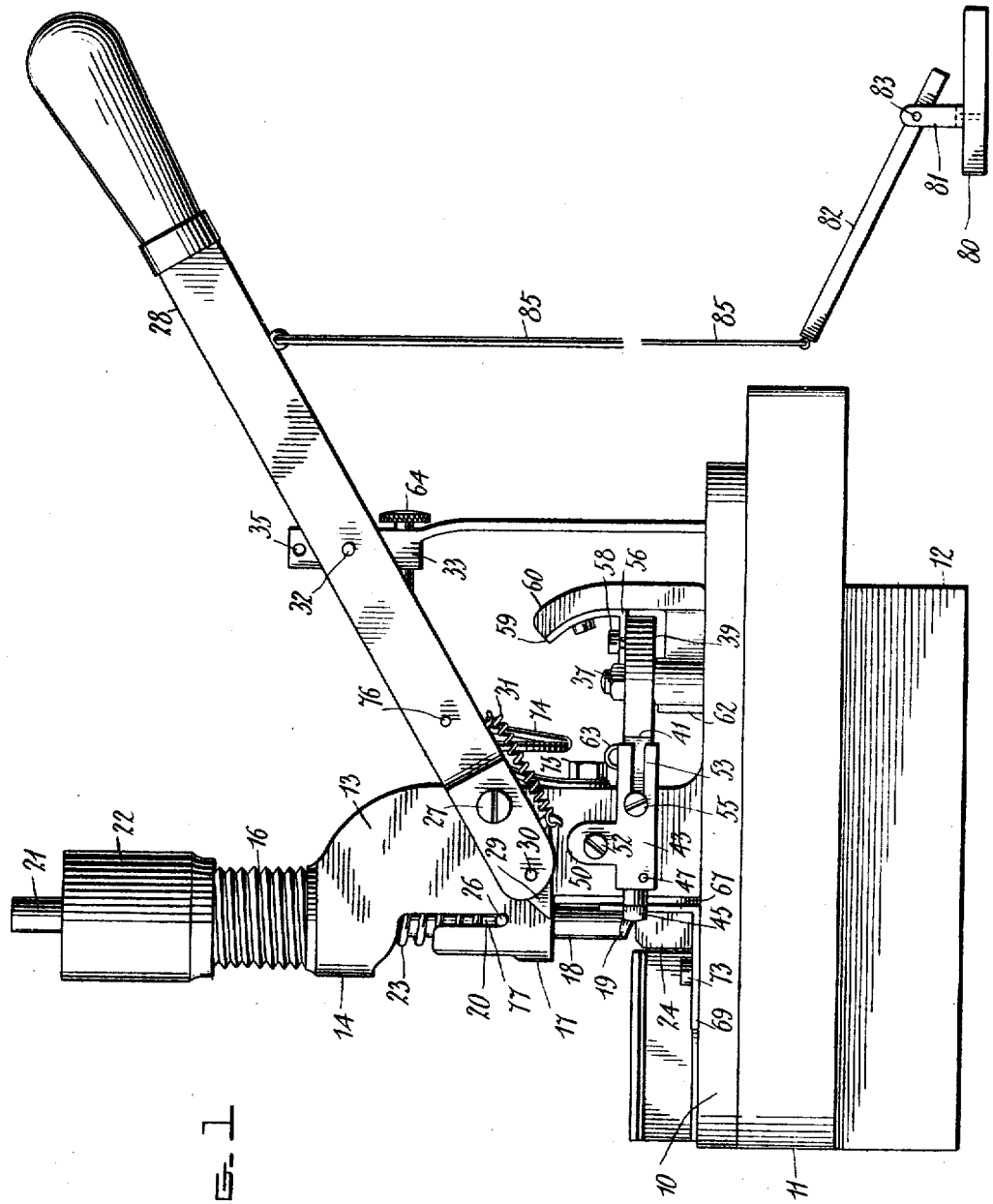

C. S. TUFENKJIAN.
AUTOMATIC SAW TOOTH SETTING MACHINE.
APPLICATION FILED JUNE 26, 1908.
926,785.
Patented July 6, 1909.
4 SHEETS—SHEET 2.
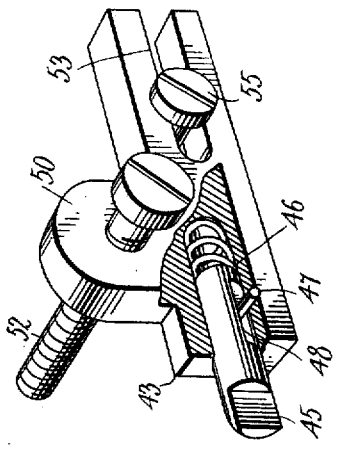
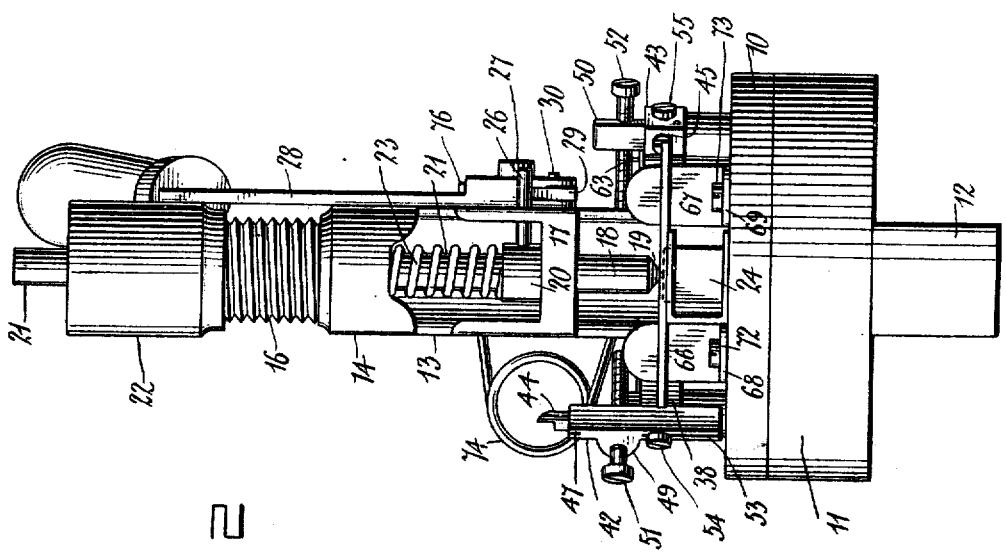

C. S. TUFENKJIAN.
AUTOMATIC SAW TOOTH SETTING MACHINE.
APPLICATION FILED JUNE 26, 1908.
926,785.
Patented July 6, 1909.
4 SHEETS—SHEET 3.
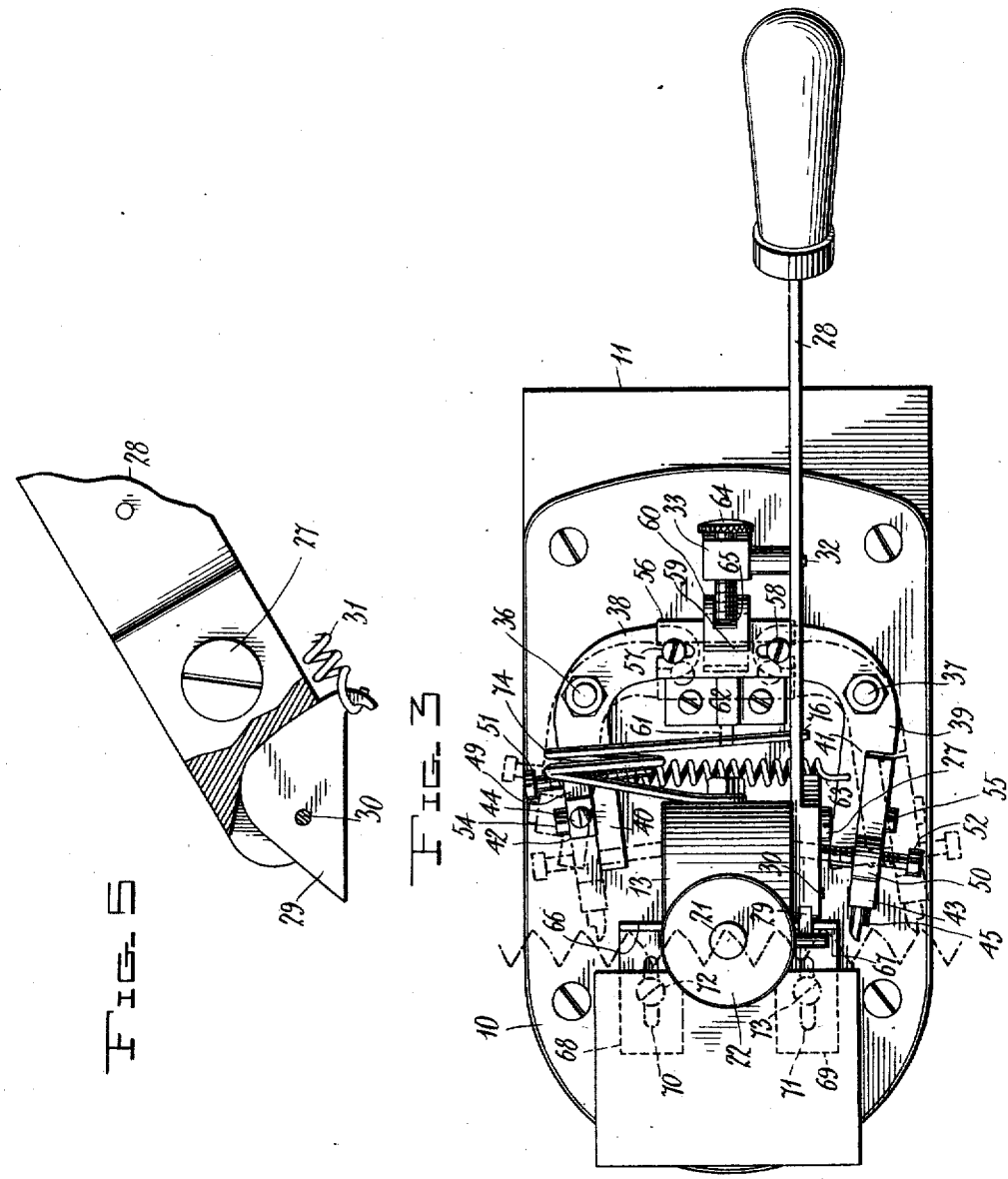
Witnesses
Inventor
Cross S. Tufenkjian,
By
Attorneys

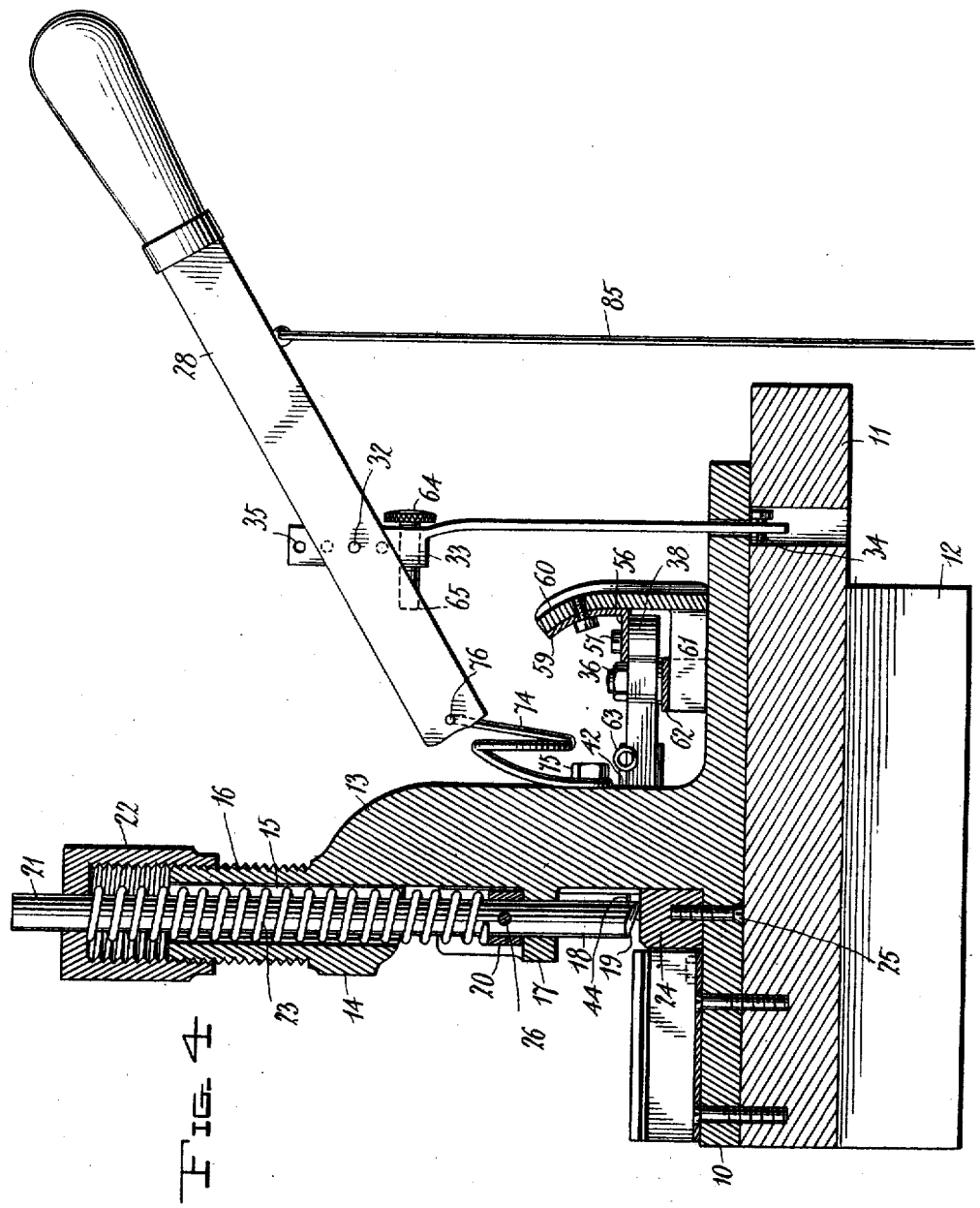

UNITED STATES PATENT OFFICE.

CROSS S. TUFENKJIAN, OF PLATTSBURG, NEW YORK.

AUTOMATIC SAW-TOOTH-SETTING MACHINE.

No. 926,785.  Specification of Letters Patent.  Patented July 6, 1909.

Application filed June 26, 1908. Serial No. 440,522.

*To all whom it may concern:*

Be it known that I, CROSS S. TUFENKJIAN, a citizen of Turkey, Armenia, residing at Plattsburg, in the county of Clinton, State of New York, have invented certain new and useful Improvements in Automatic Saw-Tooth-Setting Machines; and I do hereby declare the following to be a full, clear, and exact description of the invention, such as will enable others skilled in the art to which it appertains to make and use the same.

This invention relates to machines for automatically setting the teeth of saws, and has for one of its objects to simplify and improve the construction of devices of this character.

Another object of the invention is to provide a simply constructed device of this character wherein the teeth are set by the blow of a hammer spring actuated, and with means whereby the force of the blow may be controlled.

Another object of the invention is to provide a machine of this character wherein mechanically operated means are provided for automatically moving the saw step by step to bring the teeth one after the other in position to be acted upon by the setting implement.

Another object of the invention is to provide a machine of this character wherein automatically operated means are provided for moving the saw step by step past the setting implement and which are reversible in position so as to move the saw in either direction.

Another object of the invention is to provide a machine of this character wherein the length of the stroke whereby the saw is moved is adapted to be adjusted to correspond to the sizes of the teeth, so that saws with different sizes of teeth may be acted upon by the machine.

Another object of the invention is to provide a machine of this character wherein the saw setting mechanism and the saw moving mechanism are actuated by one stroke of a lever.

With these and other objects in view the invention consists in general in a spring actuated saw setting member and a saw moving member operative by one movement of a lever.

The invention further consists in a setting or striking member spring actuated, devices for intermittently engaging the teeth of the saw, an operating lever, with means whereby the operating lever elevates the striking member and likewise actuates the intermittent saw moving mechanism so that the striking member and the saw moving mechanism are operated by one stroke of the lever.

The invention further consists in a striking member spring actuated, two alternately operating saw moving devices adapted to be independently adjusted into and out of the path of the saw, and an operating lever adapted to actuate the striking mechanism and the saw moving mechanism.

The invention further consists in certain novel features of construction as hereafter shown and described and specifically pointed out in the claims, and in the drawings illustrative of the preferred embodiment of the invention, Figure 1 is a side elevation of the improved device. Fig. 2 is a front elevation. Fig. 3 is a plan view. Fig. 4 is a longitudinal sectional elevation. Fig. 5 is a sectional detail enlarged of the inner or latch end of the operating lever. Fig. 6 is a perspective detail partly in section of one of the saw tooth actuating pawl devices.

In setting the teeth of saws by hand, or by manually operated devices where dependence is had upon the judgment of the operator to control the force of the blow or the pressure applied, it is very difficult to produce uniform action, the result being that the teeth are irregularly set, and the saw caused to "run" when operated, and the improved device herein shown and described is designed to apply precisely the same pressure or force to the setting mechanism at each operation so that the "set" of the teeth will be uniform and "regular".

The improved device comprises a base plate 10 of any required size and preferably mounted upon a block 11 having a projection 12 from its lower side to enable the improved device to be supported in a vise or other holding means, but it will be understood that the invention is not necessarily limited to the manner in which the base 10 is supported, and if preferred may be attached to a permanent support such as a bench or the like.

Rising from the base 10 is a standard 13 having an overhanging portion 14 provided with a longitudinal bore 15, and externally threaded at 16. The standard 13 is also provided with a projecting lug 17 having a vertical bearing aperture in alinement with the bore 15.

Operating through the lug 17 is a die member 18 having its lower end 19 formed to correspond with one of the teeth of the saw which is to be set, the die 18 terminating at its upper end in an enlargement 20 from which a stem 21 extends upwardly through the bore 15 and above the upper end of the threaded portion 16. The enlargement 20 bears normally upon the lug 17.

Fitting over the threaded portion 16 of the standard 13 is a cap 22 internally threaded and engaging the threads 16 of the standard, with the stem 21 extending slidably through the cap 22. Surrounding the stem 21 within the cap 22 and the bore 15 is a spring, or a plurality of springs 23, the upper whirl of the spring bearing beneath the cap 22 and the lower whirl bearing upon the enlargement 20, the spring or springs thus operating to maintain the die 18 in its lower position, as shown.

Secured upon the base 10 beneath the die 18 is an anvil 24 preferably secured in place by a clamp screw 25 fitting through the bottom of the base 10. The angular terminal 19 of the die 18 rests upon this anvil as shown. Extending through the enlargement 20 is a pin 26 with which the die and stem elevating mechanism connects as hereafter explained. The standard 13 is formed with a guide-way 77 through which the pin 26 projects so that the die and stem are prevented from rotation horizontally while being actuated.

Pivoted at 27 to the standard 13 is an operating lever 28, the inner or shorter end of the lever having an angular latch member 29 pivoted therein at 30, one arm of the latch member projecting into the path of the pin 26, while the other arm of the latch device is connected by a spring 31 whereby the latch device is returned to its operative position when released.

A spring 74 is connected at 75 to the standard 13 and at 76 to the lever 28 and operating to maintain the outer or longer end of the operating lever yieldably in its upward position, and return it to that position automatically after each tripping of the said mechanism, as hereafter explained.

By this arrangement it will be obvious that when the long arm of the lever 28 is depressed the latch device 30 will engage the pin 26 and elevate the stem 21 and the die 18, and when the depression of the longer arm of the lever 28 has reached a certain point the outer end of the latch device will pass the pin 26 and release the stem and die and permit the spring 23 to forcibly depress the die upon the tooth of a saw resting upon the anvil 24, as hereafter explained.

Engaging the lever 28 by a pin 32 is a bar 33 preferably passing through an aperture in the base 10 and provided with a stop pin 34 below the base to limit the upward movement of the lever. The arm 33 is provided with numerous spaced apertures 35 so that the pin 32 may be set higher or lower to control the movement of the lever 28, the apertures enabling the pin to be adjusted to change the "throw" of the lever.

Swingingly coupled to the base 10 at 36—37 are two bell crank or shipper levers 38—39, the forward ends of the levers 38—39 being cut away at 40—41 to permit the attachment of the supporting members 42—43 carrying the pawls 44—45 by which the teeth of the saw are engaged as hereafter explained, the pawls fitting in sockets in the members 42—43 and maintained yieldably in their outward positions by springs one of which is represented at 46. The pawls 44—45 are prevented from rotating by transverse pins engaging flattened portions on the inner ends of the pawls, one of the pins being shown at 47 and one of the flattened portions being shown at 48. The members 42—43 are provided with upwardly projecting lugs 49—50 having threaded apertures to receive adjusting screws 51—52, the inner ends of the latter bearing against the opposite sides of the standard 13, as shown. The members 42—43 are likewise provided with longitudinal slots one of which is indicated at 53 and through which clamp screws 54—55 extend and tapped into the adjacent portion of the members 38—39, the clamp screws serving as a means for adjustably connecting the members 42—43 to the members 38—39 and likewise permitting either one of the members 42—43 to be swung up out of the way when not required so that the saw may be moved to the right or left, as hereafter more fully explained.

The inner ends of the members 38—39 are coupled by a plate 56 having slots in its ends through which clamp screws 57—58 are disposed, the slots permitting the free movement of the shipper levers. The plate 56 is provided with an upwardly extended portion 59, and rigidly connected to this latter portion is a cam member having an upper member 60 curving toward the standard 13 and preferably grooved in its rear face and with a horizontally extended portion 61 bearing upon the upper face of the base 10 and operating through a keeper 62 attached to the base, as shown. The member 60—61 is thus slidable upon the base 10. The inner portions of the members 38—39 are connected by a spring 63, which operates to maintain the inner ends of the members 38—39 which carry the pawls 44—45 yieldably in their inward positions. By this arrangement it will be obvious that pressure applied to the cam member 60—61 will force the outer ends of the members 38—39 inwardly or toward the standard 13, and distend the outer ends against the action of the spring 63, and when the pressure is removed from the cam member the spring will immediately and automatically return the members 38—39 to their normal positions.

Fitting through the member 33 is a threaded stud 64 having a rounded inner end 65 adapted to engage the curved portion 60 of the cam member and thus force the latter inwardly toward the standard 13 when the operating lever 28 is depressed, and thus actuate the members 38—39 as previously described.

Attached to the base 10 adjacent to the lower end of the standard 13 are two gage devices comprising upwardly extended portions 66—67 and horizontal portions 68—69, the latter having longitudinal slots 70—71 engaged respectively by clamp screws 72—73 tapped into the base 10 so that the upwardly extending portion 66—67 may be adjusted toward or away from the standard. These gage devices are designed to control the position of the saw relative to the anvil 24, as hereafter explained.

With a device thus constructed, the operation is as follows:—Preferably the member 42 is released by turning the screw 54 backwardly and disposing the member 42 in a vertical position so that its pawl 44 is removed from the path of the saw, while the member 43 is adjusted so that its pawl 45 will engage in the path of the saw teeth. It is obvious that by means of the longitudinal slot in the member 43 and the set screw 55 the pawl may be adjusted to any required extent relative to the saw, and by likewise adjusting the gage devices 66—67 the amount of projection of the saw teeth over the anvil may likewise be controlled, the members 66—67 being set to correspond with the depth of the teeth, a fine tooth saw requiring that the gages shall be adjusted outwardly to a greater extent than for a coarse toothed saw, as will be obvious. It will also be obvious that by adjusting the pin 32 relative to the member 33 by disposing it in one or the other of the apertures 35, the "throw" of the member 33 may be controlled and the action of the screw 64 upon the cam surface 60 likewise controlled, so that the extent of the movement of the shipper levers 38—39 may be correspondingly controlled to regulate the distance which the pawl 45 moves toward or away from the standard 13. It will thus be obvious that the pawl 45 may be adjusted to move the saw to any required extent, this adjustment being dependent upon the "pitch" of the teeth. The adjusting screw 52 bearing against the adjacent face of the standard 13 likewise performs an important function in securing the required adjustment. The different portions of the apparatus having been properly adjusted the saw is disposed with its first tooth upon the anvil 24 and the lever 28 depressed causing the latch 29 to engage the pin 26 and elevate the die 18 against the action of the spring 23, and when the depression of the lever 28 has proceeded far enough to cause the latch 29 to withdraw from beneath the pin 26 the spring 23 will forcibly throw the die 18 downward upon the tooth of the saw and "set" the same. The spring 74 then returns the lever 28 to its former position ready for another movement. In the meantime, the depression of the lever 28 has likewise caused the adjusting screw 64 to engage the cam device 61 and has operated the shipper levers 38—39 and caused the pawl 45 to engage one of the teeth of the saw and move the saw over the anvil the distance of two teeth or sufficiently to bring the next tooth in position beneath the die. The operation is thus automatic, the operator being simply required to maintain the saw with the teeth at the opposite sides of the die in engagement with the gage devices 66—67. After each alternate tooth of the saw has been "set" as above described, the member 43 is released and turned with its pawl out of the path of the saw teeth, while the member 42 is adjusted with its pawl in the path of the saw teeth and the saw reversed in position and arranged with the first unset tooth in position upon the anvil, and then at the continued operation of the lever 28, the remaining alternate teeth of the saw will be successively "set", as will be obvious.

The device is simple in construction, can be inexpensively manufactured, and adjusted to fit the teeth of saws of various sizes, and thus adapt the device to the work required of it.

The parts of the device are strong and durable, and not liable to get out of order and adapted to withstand the severe strains to which devices of this character will be subjected.

By adjusting the cap 22 it will be obvious that the tension of the spring 23 may be altered as required to adapt the device to saws of various thicknesses, thicker saws requiring a heavier blow than the thinner saw blades, as will be obvious.

The operating lever 28 may be actuated in any suitable manner, but will preferably be operated by a foot treadle so that the operator will have both hands free to handle the saw.

An improved form of the foot treadle mechanism is shown comprising a base 80 having a U shaped member 81 connected thereto and between which the treadle 82 is mounted to swing upon pivots 83, the free end of the treadle being connected to the outer end of the lever 28 by a pull cable 85.

What is claimed, is:—

1. A device of the class described comprising an anvil, a support for a saw, a die, means for actuating the same including an operating lever, two oppositely arranged shipper levers coupled at their rear ends, pawls at the ends of said shipper levers and extending into the path of a saw held upon said support, means for allowing said pawls to be withdrawn from the path of the saw, a cam member carried by said shipper levers at their junctures, and a trip member carried by said operating lever and engaging with said cam member to actuate the shipper levers, when the operating lever is depressed.

2. A device of the class described comprising a base, an anvil carried by said base, a standard rising from said base, a die carried by said standard, means for actuating said die, two shipper levers swinging upon said base, means for coupling said shipper levers at one end, pawl devices carried by said levers at their free ends and adapted to be projected into the path of the teeth of a saw bearing upon the anvil, an operating lever, and means carried by the operating lever and engaging the coupling means of said shipper levers to simultaneously actuate the same.

3. A device of the class described comprising a base, an anvil carried by said base, a standard rising from said base, a die carried by said standard, an operating lever swinging from said standard, means whereby said lever is caused to actuate said die, two shipper levers swinging upon said base, means for coupling said shipper levers at one end, pawl devices carried by said shipper levers at their free ends and adapted to be projected into the path of the teeth of a saw bearing upon the anvil, a curved cam device connected to said lever coupling, and a stud extending from said lever into the path of said cam device.

4. A device of the class described comprising a base, an anvil carried by said base, a standard rising from said base, a die carried by said standard, an operating lever swinging from said standard, means whereby said lever is caused to actuate said die, two shipper levers swinging from said base, means carried by said shipper levers at one end for engaging the teeth of a saw bearing upon said anvil, a guide device carried by said base between said shipper levers, a member slidable in said guide device, means for movably coupling said slidable member to said shipper levers, and means whereby said slidable member is actuated by the depression of said operating lever.

5. A device of the class described comprising a base, an anvil carried by said base, a standard rising from said base, a die carried by said standard, an operating lever swinging from said standard, means whereby said lever is caused to actuate said die, two shipper levers swinging upon said base, a pawl swinging from one end of each shipper lever and adapted to be projected into the path of the teeth of a saw bearing upon said anvil, a guide device between said shipper levers, a member slidable upon said guide device, means for coupling said slidable member to said shipper levers, a cam device carried by said slidable member, and a stud carried by said operating lever and extending for engagement with said cam device when the operating lever is depressed.

6. A device of the class described comprising a base, an anvil carried by said base, a standard rising from said base, a die carried by said standard, an operating lever swinging from said standard, means whereby said lever is caused to actuate said die, two shipper levers swinging upon said base, a pawl swinging from one end of each shipper lever and adapted to be projected into the path of the teeth of a saw bearing upon said anvil, a guide device, a member slidable upon said guide device, means for coupling said slidable member to said shipper levers, a cam device carried by said slidable member, a stud carried by said operating lever and extending for engagement with said cam device when the operating lever is depressed, and a rod depending from said stud, and stop carried by said rod and adapted to engage said base when the operating lever is elevated to limit the upward movement thereof.

In testimony whereof, I affix my signature, in presence of two witnesses.

CROSS S. TUFENKJIAN.

Witnesses:
HENRY E. BARNARD,
ANDREW McKEEFE.